(12) United States Patent
Jha et al.

(10) Patent No.: US 12,394,327 B2
(45) Date of Patent: Aug. 19, 2025

(54) AUGMENTED REALITY AND VIRTUAL REALITY SYSTEMS

(71) Applicant: SimInsights, Inc., Lake Forest, CA (US)

(72) Inventors: Rajesh Kumar Jha, Irvine, CA (US); Douglas Choi, Irvine, CA (US)

(73) Assignee: SIMINSIGHTS, INC., Lake Forest, CA (US)

( * ) Notice: Subject to any disclaimer, the term of this patent is extended or adjusted under 35 U.S.C. 154(b) by 81 days.

(21) Appl. No.: 17/441,534

(22) PCT Filed: Feb. 27, 2020

(86) PCT No.: PCT/US2020/020231
§ 371 (c)(1),
(2) Date: Sep. 21, 2021

(87) PCT Pub. No.: WO2020/176803
PCT Pub. Date: Sep. 3, 2020

(65) Prior Publication Data
US 2022/0172633 A1    Jun. 2, 2022

Related U.S. Application Data

(60) Provisional application No. 62/811,316, filed on Feb. 27, 2019.

(51) Int. Cl.
| | |
|---|---|
| *G09B 5/06* | (2006.01) |
| *G06F 3/04815* | (2022.01) |
| *G06T 15/00* | (2011.01) |
| *G06T 19/00* | (2011.01) |
| *G09B 19/00* | (2006.01) |

(52) U.S. Cl.
CPC .......... *G09B 5/065* (2013.01); *G06F 3/04815* (2013.01); *G06T 15/00* (2013.01); *G06T 19/006* (2013.01); *G09B 19/003* (2013.01); *G06T 2200/24* (2013.01)

(58) Field of Classification Search
CPC .............. G09B 5/00; G09B 5/02; G09B 9/00; G09B 19/24
See application file for complete search history.

(56) References Cited

U.S. PATENT DOCUMENTS

| | | | | |
|---|---|---|---|---|
| 9,305,403 | B2* | 4/2016 | Cabrita | ............... A63F 13/5255 |
| 10,438,415 | B2* | 10/2019 | Hendricks | ................ G09B 5/02 |
| 2013/0342573 | A1* | 12/2013 | Leazenby | ............. G06T 19/006 |
| | | | | 345/633 |
| 2017/0213473 | A1 | 7/2017 | Ribeira et al. | |
| 2018/0218627 | A1* | 8/2018 | Smith Lewis | ......... G09B 5/125 |
| 2018/0293802 | A1 | 10/2018 | Hendricks et al. | |
| 2019/0139426 | A1* | 5/2019 | Kesavadas | ............ G06T 19/006 |

OTHER PUBLICATIONS

WO, PCT/US20/20231 ISR and Written Opinion, Jun. 22, 2020.

* cited by examiner

*Primary Examiner* — Robert J Utama
(74) *Attorney, Agent, or Firm* — ONE LLP

(57) ABSTRACT

Provided herein are embodiments of a system for representing, persisting, authoring and publishing immersive reality simulations. The system may include an authoring software, wherein the authoring software may include an AR or VR virtual objects and scenario authoring tool, a published AR or VR experience, a data pipeline module. and a dashboard module. The system may be used for creating educational and training content for AR and VR environments.

20 Claims, 21 Drawing Sheets

Figure 4. Specimen snapping in between the grips of the Instron machine.

Figure 6: Left: Realistic rendering of specimen and its fracture surfaces. Right: contour of von Mises stress during yielding and fracture, computed using Abaqus nonlinear FEA simulation.

Figure 8: Visualization of von Mises stress contours on the test specimen as it undergoes testing. Left: tensile test. Right: three-point bend test.

Figure 7: Specimen results visualized in Unity for tensile and three-point bending tests. The (P) indicates structure without imperfections. The (I) indicates presence of imperfections.

Figure 9: Example of a scenario model

FIG. 9

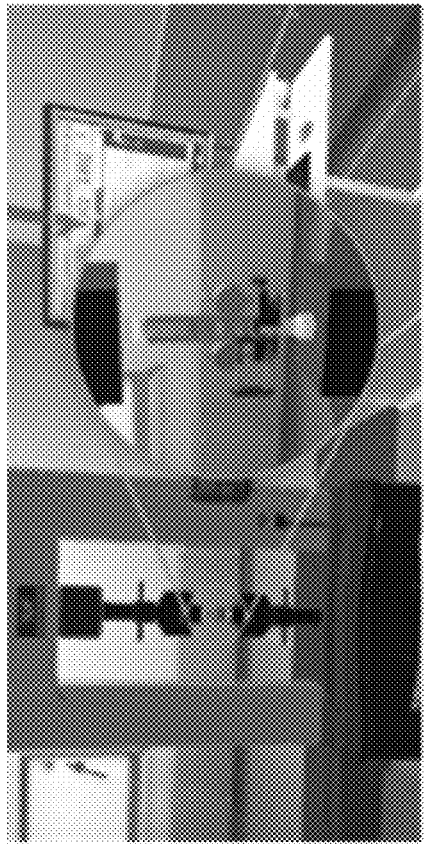

```
"tasks":[{
    "id":"lab-safety",
    "name":"safety",
    "text":"Wear safety glasses.",
    "explanation":"Wear safety glasses.",
    "timer":0,
    "onTaskStart":[{ "LoadGlasses" }],
    "guidance":[
        "panelTarget":"Lens_pink",
        "objectsToHighlight":{ "LensPink" },
        "objectsToPointTo":[{ "LensPink" }],
        "video":"glasses-video"
    }]
}]
```

Figure 11: Example of a task model

FIG. 11

Figure 10: Zoomed view of the specimen in the Instron machine with an extensometer attached to it. Behind it is a computer monitor showing the Bluehill software.

FIG. 10

Figure 13A: Pedagogial agent in VLab.

Figure 12: View of the instruction panel.

```
{
  "trigger":"use",
  "target":"button",
  "actions":[{
    "vp":"teacher",
    "timeline":[{
      "action":"walk",
      "parameters":{
        "target":"InstronMachine"
      }
    },{
      "action":"say",
      "parameters":{
        "message":"We will be using this Instron Machine to perform a tensile test on the aluminum specimen.",
        "voice":"Matthew"
      }
    }]
  }]
}
```

Figure 13B: Sample virtual person definition

FIG. 13B

Figure 15: Dashboard showing a session overview, link analysis, record-replay video, and actions list.

Figure 16: The record/replay system and control panel.

Figure 17: VR scenario authoring tool

| Action Name | Action Description and Attributes (in bold) |
|---|---|
| task_start | Logged when a student begins a task. task: the identifier of the started task |
| teleport | Logged when a student teleports to another location. controller: the controller that activated the teleport. (x, z): the virtual position in that user teleported to |
| voice_command | Logged when a student uses a voice command. intent: the intent predicted by Amazon Lex when a voice command was used |
| use | Logged when a student uses a virtual object. controller: the controller that used the object. target: the used virtual object |
| grab | Logged when a student picks up an object. controller: the controller that grabbed object. target: the grabbed virtual object |
| ungrab | Logged when a student drops a held object. controller: the controller that dropped the object. target: the dropped virtual object |
| snap | Logged when a student attaches an object into another. dropzone: the location in which VO was snapped into. target: the snapped virtual object |
| change_state | Logged when a virtual object changes state. target: the virtual object that changed state. state: the virtual object's new state |
| submit_answer | Logged when a student answer quiz question. questionId: the quiz question that was answered. correct: 1 if the student answered correctly, otherwise 0. choice: the selected multiple choice answer |

Table 1: List of actions along with their descriptions and attributes.

FIG. 18

AUGMENTED REALITY AND VIRTUAL REALITY SYSTEMS

RELATED APPLICATIONS

The present application is a 371 of International Patent Application Serial No. PCT/US20/20231, filed on Feb. 27, 2020, which claims priority to U.S. Provisional Patent Application Ser. No. 62/811,316, filed on Feb. 27, 2019, both of which are hereby incorporated by reference in their entireties herein.

FIELD

The subject matter described herein relates to systems, methods, and apparatuses for creating content for augmented reality (AR) and virtual reality (VR) environment. In particular, provided herein are embodiments of computer-based systems, methods, and apparatuses for creating educational and training content for AR and VR environment.

BACKGROUND OF THE INVENTION

The last few years have seen introductions of new AR and VR devices into the market by leading software and hardware companies. Collectively, these companies have invested billions of dollars into these projects and are aggressively creating opportunities in both consumer and enterprise markets. However, significant impediments to rapid adoption of these devices in various industries and settings include the high cost and complexity of creating content suitable for those devices.

For example, in the mechanical industry, if a user wants to design a particular object he or she can use computer-aided design (CAD), but there is no current method that would allow the user to do so in an AR or VR space.

To create content for AR and VR space requires extensive programming skills, is time consuming, and has many other limitations, such as not being able to be translated or published across devices. Such use restrictions and significant benefits of AR or VR devices are not just limited to the mechanical industry. Other industries, such as medical devices, semiconductors, pharmaceuticals, healthcare, etc., and various departments within them, such as manufacturing, sales, advertising, etc. would also benefit from being able to work in an AR or VR environment. Further, the currently available AR or VR devices also cannot accurately and efficiently analyze user-interaction data for not only their own troubleshooting but also for improving and personalizing user interaction with the AR or VR environment.

Accordingly, there is a need for systems, methods, and apparatuses for authoring content for use in AR or VR devices and are suitable for various industries, and that is more technologically efficient, requires less skill (for example, in some cases, the AR- and VR-based content may be created by non-computer programmers or by a machine), and is less time consuming to use.

SUMMARY OF THE INVENTION

Provided herein are embodiments for systems, methods, and apparatuses for authoring content for use in AR or VR devices. In some embodiments, a system may include an authoring software, wherein the authoring software may include a repository of assets such as virtual objects, etc., AR or VR scenario authoring tool, conversational interaction module, multiplayer module, a published AR or VR experience, a data pipeline module, and a dashboard module.

In some embodiments, the system may include design tools in an AR or VR space, including allowing users to physically interact with virtual objects in a 3D space with its digital virtual representation designed in a 3D space as opposed to a 2D space, for example, on a computer screen.

In some practical applications, the system may combine high fidelity 3D models of test equipment in the mechanical industry (or other equipment or objects in other industries) with real time and accurate finite element simulation of test specimens to substantially enhance learning and engagement of the users while also expanding access, reducing the bottlenecks of time available to work on machines, and reducing the overall expense.

In some embodiments, the authoring software may be configured to receive first data for one or more virtual objects, receive second data for a scenario, load the first data into a scenario data structure associated with the scenario, save the scenario data structure in a repository, receive a search request for a requested third data, search the repository for the requested third data, and transmit the requested third data. The first data comprises at least one of geometry, rendering or visual, motion, interaction, telemetry, functions, and recognition aspects.

In some embodiments, the first data may comprise logged data during an immersive reality environment session. The logged data may be collected using one or more cameras or sensors. The logged data may be used for personalizing user experience.

In some embodiments, an authoring system of the present disclosure for virtual immersive learning environment may comprise a server comprising a processor for automatically generating a scenario data structure. The server may further comprise an authoring software configured to generate the first data for one or more virtual objects, generate second data representing digital rendering of a first virtual scenario, generate the scenario data structure associated with the first virtual scenario, store the scenario data structure in a digital data repository, receive a search request for a requested third data, wherein the search request comprises data representing a second virtual scenario, search the digital data repository for the requested third data, transmit the requested third data. The third data may then be displayed and used in another virtual immersive learning environment.

Other features and advantages of the present invention are or will become apparent to one skilled in the art upon examination of the following figures and detailed description, which illustrate, by way of examples, the principles of the present invention.

In some embodiments, the system may accurately and efficiently analyze user-interaction data for troubleshooting as well as for improving user interaction with the AR or VR environment.

The systems, methods, and apparatuses for authoring content for use in AR or VR devices described herein in detail are only example embodiments and should not be considered limiting. Other configurations, methods, features and advantages of the subject matter described herein will be or will become apparent to one with skill in the art upon examination of the following figures and detailed description. It is intended that all such additional configurations, methods, features and advantages be included within this description, be within the scope of the subject matter described herein and be protected by the accompanying claims. In no way should the features of the example embodiments be construed as limiting the appended claims, absent express recitation of those features in the claims.

BRIEF DESCRIPTION OF THE DRAWINGS

The present invention may be better understood by referring to the following figures. The components in the figures are not necessarily to scale, emphasis instead being placed upon illustrating the principles of the disclosure. In the figures, reference numerals designate corresponding parts throughout the different views.

FIGS. 3A-3C illustrate various JavaScript Object Notations, according to exemplary embodiments of the present invention.

FIG. 9 illustrates a JSON-based scenario model representation, according to exemplary embodiments of the present invention.

FIG. 10 illustrates a scenario model, according to exemplary embodiments of the present invention.

FIG. 11 illustrates a task model, according to exemplary embodiments of the present invention.

FIG. 13B illustrates a virtual person model, according to exemplary embodiments of the present invention.

FIG. 18 illustrates exemplary tabular representation of action data, according to exemplary embodiments of the present invention.

DETAILED DESCRIPTION

Figure 1:
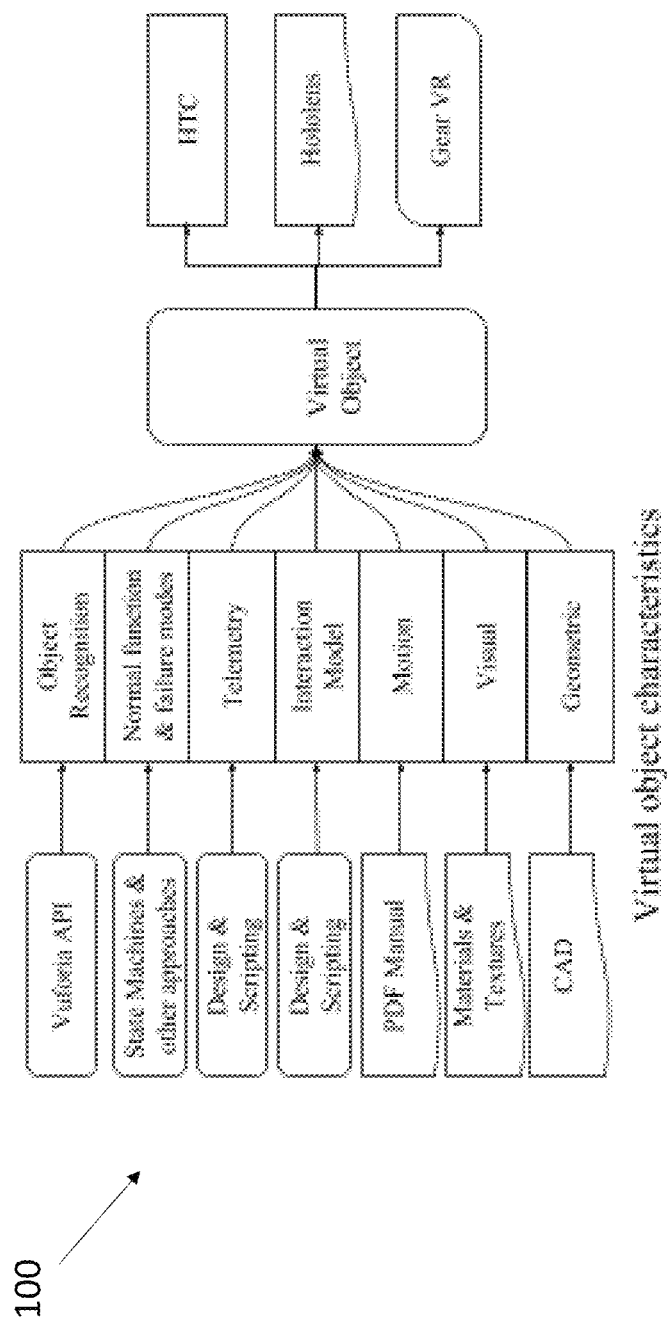
FIG. 1 illustrates virtual object characteristics, according to exemplary embodiments of the present invention.

The below described figures illustrate the described invention and method of use in at least one of its preferred, best mode embodiments, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, what is illustrated is set forth only for the purposes of example and should not be taken as a limitation on the scope of the present invention.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

While the apparatus, methods, and systems described herein may be used in any industry and for any purpose, in some embodiments, they may be applicable to manufacturing and material testing. Generally, the present disclosure may include authoring tools that allow non-programmers to create and publish content for VR/AR immersive environment. The content may log data at experience time which can be used to gain insights. An authoring software may be installed and executed on any computing device, such as PC, mobile, AR or VR devices, etc., that enable non-programmers to create high quality, engaging, and effective AR- and VR-based content that may be downloaded and viewed on the computing device. As used herein, the term XR includes AR, VR, mixed Reality in an immersive environment.

In some embodiments, the present disclosure may include a system for representing, persisting, authoring and publishing immersive XR simulations. When users experience these simulations, the system may collect interaction data and analyze them to draw conclusions about users and their experiences. The system may include high-fidelity virtual objects (VOs) that can interact with users and with other virtual objects. Such interactions generate data traces which can be analyzed. The modularity of interaction may enable objects to exhibit intelligence in some sense, which reduces the authoring burden. This is valuable, for example, to faculty who want to create lesson plans to teach students in XR environment, as well as industry users who want to guide workers in assembling or fixing products. When such smart objects are collected in a repository, authoring becomes easier and easier as the number of objects grows, yielding increasing returns and a kind of object-to-object network effect.

Virtual Object (VO)

The system may include computer representation capable of encapsulating high-fidelity virtual objects (VO or simulations) that can be used with multiple XR devices. In some embodiments, a virtual object model may represent a variety of machinery with the necessary fidelity for training. A VO model may be modular and reusable in a wide variety of training scenarios needed to support the learning of varied aspects of equipment operation related knowledge and skills.

Figure 2:
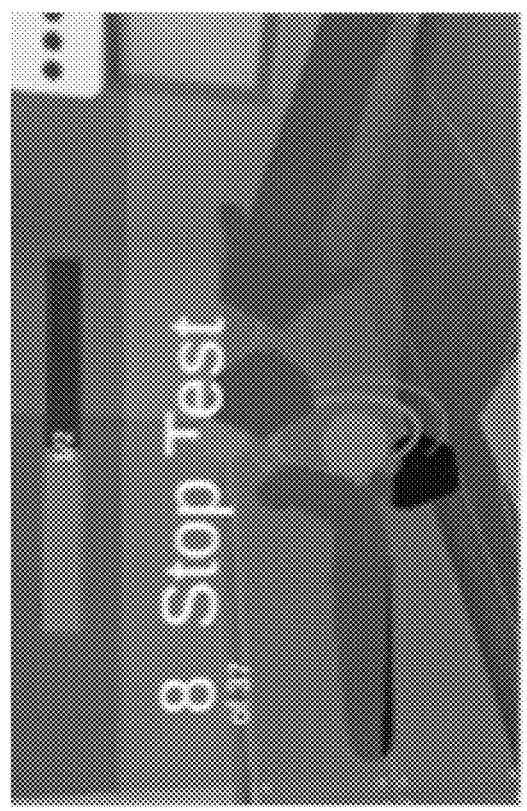
FIG. 2 illustrates a virtual object interacting with other objects. according to exemplary embodiments of the present invention.

As illustrated in FIG. 1, a virtual object 100 may include multiple sub-models representing, for example, geometry, rendering or visual, motion, interaction, telemetry, normal functions and failure models, as well as recognition models, i.e. information required for the physical objects that are highly similar to the virtual objects to be recognized by AR devices. The geometric model may include one or more meshes, which can be, for example, in .fbx, .obj, or other 3D formats. The visual model may contain materials and textures to enable photo-realistic rendering or optimized for lower end devices, including mobile devices. The motion model may contain animation files and/or scripts defining dynamic movements at runtime. The interaction model may specify how the virtual object interacts with the user as well as with other objects in a scenario. For example, as illustrated in FIG. 2, a user may attach a holder at the end of a specimen. The virtual object may be packaged into a 3D (e.g., Unity3D) asset bundle and scripts, which may be precompiled into dynamic-linked libraries (.dll files). The scripts added during virtual object creation may be compiled, for example, with a C # compiler for all targeted devices, uploaded with the virtual object to the repository, and may be retrieved and executed at runtime.

In some embodiments, an asset bundle may include a 3D model (.fbx, .obj, etc.), textures/materials (.png, .jpg, .mat), animation file(s) (.anim), behavior scripts/components (.dll), Metadata for initialization (.json), data for action, dialogue, etc. (.json).

VO's may contain definition of how they should interact with other objects and users. This provides VO modularity and reusability.

VO's can be stored in a cloud repository and then used to define scenarios. Scenarios may be combined with tasks that users have to do, plus task instructions which can guide the users. Also, telemetry is built into the environment and the virtual objects, so that the VO's can be dragged into many scenarios and then they behave correctly and also log data correctly.

In some embodiments, data logging for any interactions with virtual objects may occur automatically during runtime by virtue of the telemetry system. At runtime, headset and controller positions and orientations may be streamed to a data logging server (e.g., via HTTP) and stored in a database (e.g., using MySQL).

Figures 3A, 3B, 3C:
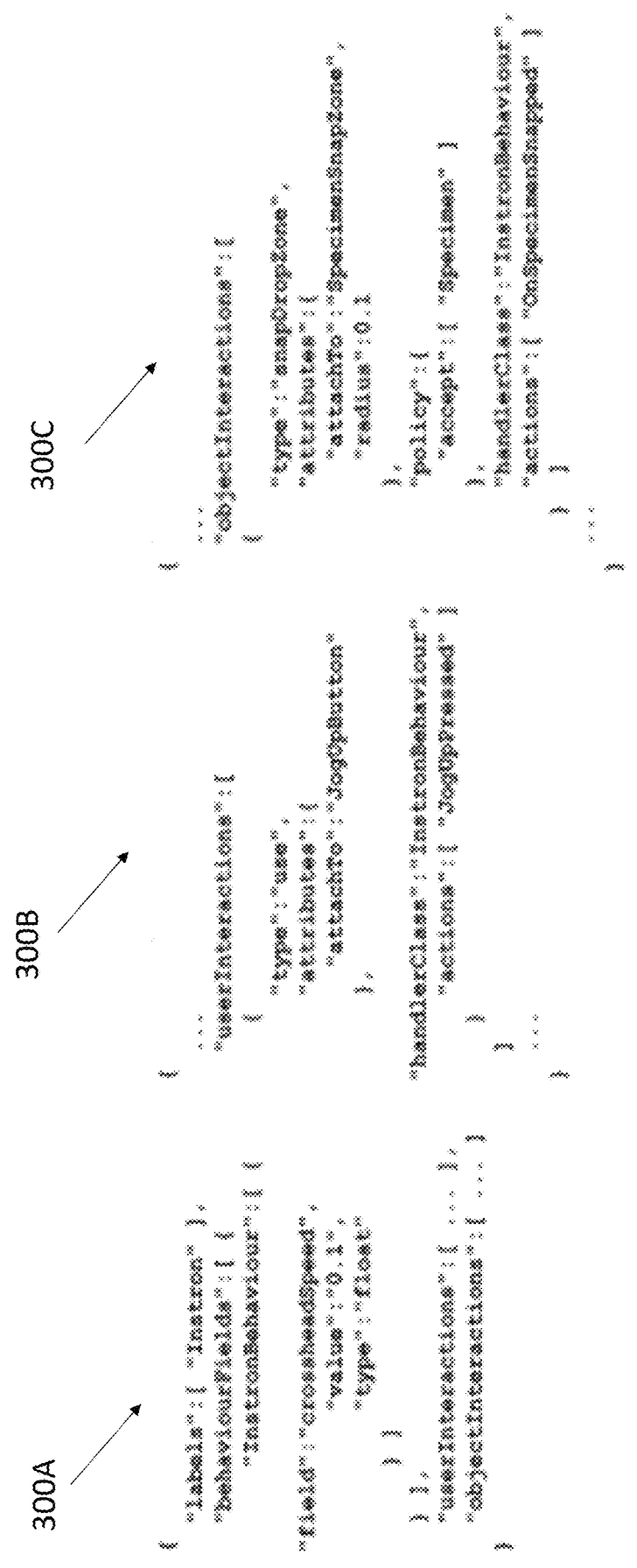

As illustrated in FIG. 3A, an interaction JavaScript Object Notation (JSON) 300A, which is an open-standard file format that uses human-readable text to transmit data objects consisting of attribute-value pairs and array data types, representation may define how a virtual object should interact with other entities. User interactions 300B, as illustrated in FIG. 3B, may define how a user can interact with a virtual object. Each user interaction may be defined by a type, such as push (e.g., pushing a button), grab (e.g., grabbing an object), or release (e.g., dropping a grabbed object), etc. Object interactions 300C, as illustrated in FIG. 3C, define how the virtual object should interact with other objects. The definition may accord the virtual object a way to broadcast events and receive relevant events from the XR environment.

Figure 4:
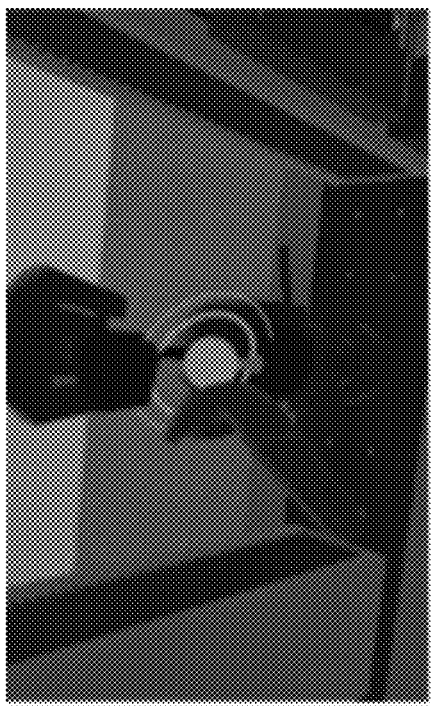
FIG. 4 illustrates a virtual object interaction, according to exemplary embodiments of the present invention.

In some exemplary operations, object interaction may be specified using JSON data and may be defined to be of a specific type. In some embodiments, the types may be: 1) SnapDropZone type, which allows for the virtual object to accept another virtual object to be inserted into it. For example, the test specimen can be inserted or snapped between the grips of the machine, as illustrated in FIG. 4; 2) Collision type, which occurs when a virtual object collides with another virtual object; 3) Send type, which may broadcast (e.g., when the broadcast function is called in C #) an event to the environment; and 4) Receive type, which may include a listener, such as for broadcasted events of an event name (e.g., by using the delegate function in C # language). Each virtual object interaction may define a set of attributes required by certain object interaction types. For instance, the send and receive interaction types may define an event name.

It should be noted that although JSON is mentioned in the exemplary embodiments herein, other suitable methods and technologies may also be used.

In some embodiments, an interaction policy may be specified (e.g., in the JSON data) and may define a condition that an interaction can only occur if the interacting virtual object has the accepted string label or tag. For all other virtual objects without the accepted string label, the interaction may not occur. All virtual objects may be tagged with one or more string labels. The interaction policy may be used to limit the virtual objects' interactions with certain categories of objects (e.g., the machine should only interact with material test specimens). For each user and object interaction, a handler script and action may be defined within the object data that is stored in the repository that may be online or offline. The handler script may be written in C # or any other programming language and may respond to the user or object interaction, and the actions may be the functions within that handler script that are called (executed) when the interaction occurs. These two fields may enable the virtual object creator to add complex interactions and functionality through scripting in response to two interacting objects. In some embodiments, the virtual object creator's role may not be the same as the author. The virtual object creator may be a programmer and the author may be a non-programmer domain expert or vice versa. Compared to detailed physics simulation-based approaches to modeling interactions, this approach to defining interactions has the advantage of requiring much less computation while providing adequate interactivity for training use cases and also greater predictability of simulation behavior and user experience. Use of a curated collection of tags and JSON specifications to capture aspects of interactions within modular and reusable virtual objects is but one of the innovative aspects of the disclosed system. This enables scenario authoring without coding as well as telemetry and data collection to function properly.

In some embodiments, the virtual objects may be created to reflect real life flaws and other properties sampled from a distribution as they appear in the actual objects. The virtual object may contain randomized properties, and may be called a randomized virtual object (RVO). At runtime, property values may be sampled from a specified distribution. In the case of randomizing flaws in the specimen, when the virtual object is loaded, the pre-processed data is queried and randomly fetched from a materials database. The scenario JSON may also be extended to reference user defined functions in custom scripts to check for step completion conditions and/or add additional functionality or logic at the completion of the task. This makes the step by instructions "smart" in the sense that as soon as the user completes the task step, the instruction advances to the next step without the user having to push a button or issue a command verbally.

In some embodiments, the VO may represent a virtual person (VP). This is the same as a virtual object, except the VO may contain a model with a skeleton and additional information on how the virtual person should act. Key elements of a VP may include:
1. Skeleton
2. Mesh
3. Animations
4. State machine.

Possible actions of a VP may include:

| Action | Completion |
|---|---|
| Wait(int seconds) | After x seconds |
| WalkToTarget(GameObject target) | When reaches target |
| WalkToPosition(Vector3 position) | When reaches position |
| LookAt(GameObject target) | When looking at target |
| PointTo(GameObject target) | When animation completes |
| Say(string message) | Immediately after called |
| GestureSay(string message) | After the voice sample is completed |
| Grab(GameObject target) | When animation completes |
| Use(GameObject target) | When animation completes |

Dialogue. The system may include a representation to command the virtual persons through preset actions, such as walking, dancing, saying, etc. An author is able to use an interface to author full dialogue which will use a user's utterance to select dialogue options/intents.

The system may include specially designed app-level chatbots to allow users to control or ask questions about app-level functionality via voice. Examples of such questions include "Where is the caliper?" (system responds by creating an indicator to point out the caliper virtual object), "How do I teleport?" (the chatbot tells the user how one can teleport), etc. Listening can be button based or continuous, at user's preference.

In some embodiments, the system may include a type of VO called Assembly VO which may include assembly task steps. The assembly task instructions may allow for 3 types of assembly steps: (1) Mechanical step involves attaching one part into another part. Parts may be highlighted in XR to serve as visual aid to the user. (2) Wiring step defines a wiring path between two parts. In XR, the path may be displayed to the user. (3) Snapshot step is a step that pauses the animation at specific time in XR. This is to indicate the state of the assembly during that step.

The system may include authoring tools for task instructions to simulations. These are "basic instructions" that appear in the XR (as opposed to smart instructions).

The system may include authoring tools for virtual persons and action/dialogue trees to be simulated in XR. The virtual persons may receive actions such as WalkTo, Speak, Idle, etc. and perform them in the scenario based on the dialogue tree.

The system may include tools for users to define conditions for step completion based on object or user interactions from their uploaded models. For example, to be able to detect completion when a button on a virtual object is pushed.

The author can define assembly instructions for an assembly virtual object. The author can specify which part of the virtual object in the model hierarchy can be grabbed and assembled, and where the initial position of the part should be during the initialization of the simulation.

Task and Scenario

In some embodiments, the system may include scenario model and task model. A XR scenario (or scenario) is the digital rendering of an XR space. A scenario may include a collection of VOs, environment, and scripts. In some embodiments, a task may define encapsulation of information to represent task instructions. Each task may exist in the context of a scenario. For example, a task may contain a problem or goal statement along with a description of resources. It may or may not include a list of task instructions. For example, a quiz problem is a task, as is a game level or a game. An example of a VR task may include: Perform metal tensile test on a VR Scenario. By way of example, consider the analogy to a word problem a high school teacher may create for homework or test. She may include a picture with the problem. She may also break down the problem into subproblems. Scenario may correspond to the picture, task instructions may correspond to subproblems or hints.

In some embodiments, the following process may be performed:
1. Author assembles a scenario by adding VOs or selects an existing scenario.
2. System filters out all tasks that use "requiredVOs" which are the VO's required in this scenario, and then presents the filtered list of tasks to the author user
3. Author user selects the task or copies the task as a template.
4. Optional—Author modifies task instructions.
5. Save scenario
6. Publish In some embodiments, the system may include playlist which may include a linear or nonlinear-branching chain of many scenarios or tasks. For example, a playlist could be: Tutorial sim followed by Instron Sim Followed by Quiz. Another playlist could be Instron sim with task instructions followed by Instron sim without task instructions (as an assessment)).

In some embodiments, the system may include a quiz model. A quiz may define encapsulation of information to represent a set of quiz questions.

Figure 5A:
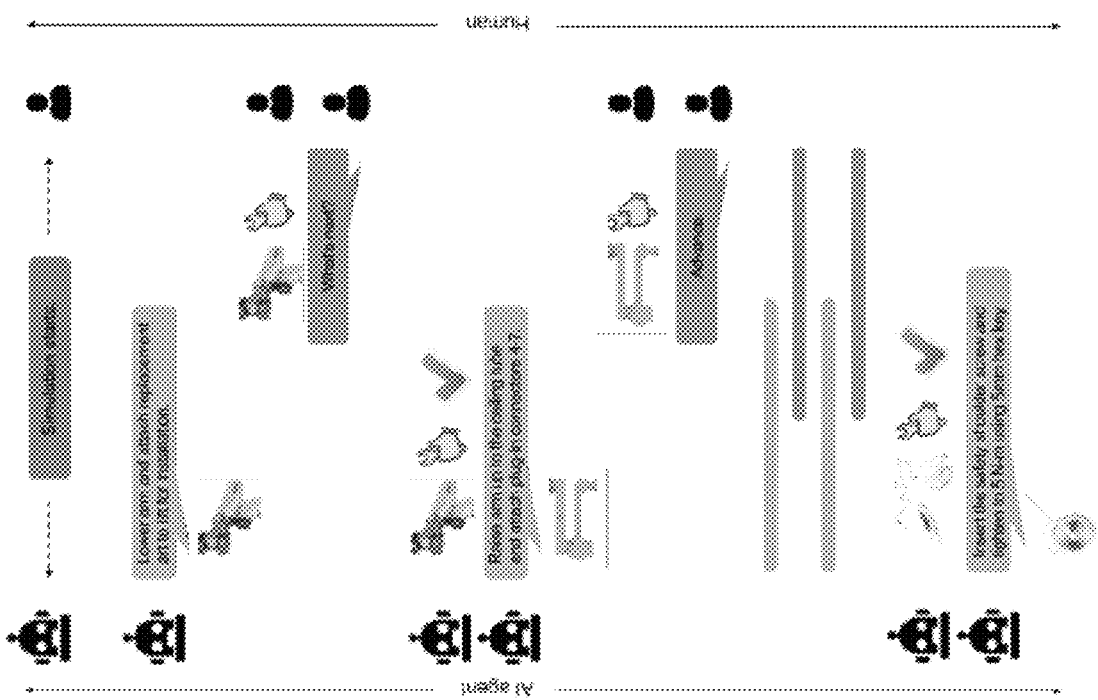
FIG. 5A illustrates a sample dialogue exchange, according to exemplary embodiments of the present invention.

A task instruction model (TIM) may thus provide list of resources and step by step instructions. In some embodiments, instructions can be thought of as dialogue between an AI agent and a user in which the AI agent provides text or spoken instructions and the user responds with actions, gestures or spoken questions. FIG. 5A illustrates a sample dialogue exchange. Agent utterances can be different types, e.g. ProvideInformation, RequestAction, etc. In response, the user may complete an action (ResponseAction), or say utterances (ResponseUtterance) such as Next, Repeat, etc.

In some embodiments, a task instruction syntax may include:
"id": Unique identifier for this task
"name": The name of the instruction.
"text": The body of text displayed to the user to describe the instruction.
"explanation": A second body of text that provides further explanation of the text.
"highlight": The name of the specific gameObject to highlight while this instruction is active.

"timer": Indicates the time in seconds that the instruction will display before automatically advancing to the next task. If user input is required for advancement, this field will be 0.

"onTaskStartFunctions": An array of strings that hold the name of specific, custom functions appended to the 'GameManager' object. These functions will be called at the beginning of this instruction. Leave the array size to 0 if no functions are required.

"StandAt": string name of gameObject, placed at the player's optimal standing location for the instruction.

As described herein, the system may save simulations. A saved simulation may include many content types, such as object metadata, task instructions, videos, images, sounds, etc. In some embodiments, JSON may be used to represent the content.

In some embodiments, the system may provide building blocks of an authoring system and in an embodiment, modules may be applied to various tasks conducted in the system to author content.

Through authoring, a user can define how a step should be completed by defining what type of interaction is required. These can include performing a snap zone action, use action, grab action, ungrab action, etc., for example.

Figure 5B:
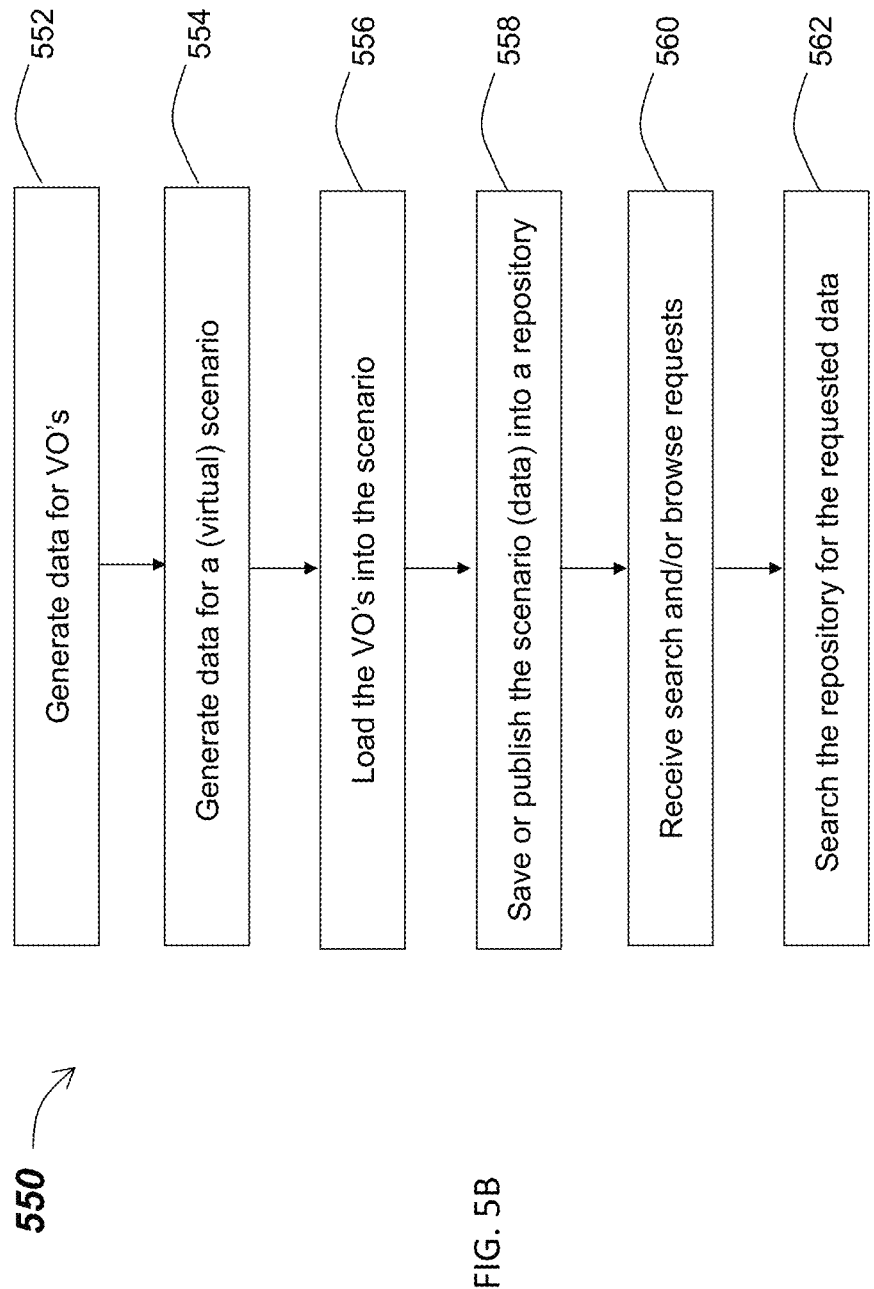
FIG. 5B illustrates a high-level diagram of an exemplary process, according to exemplary embodiments of the present invention.

FIG. 5B illustrates a high-level diagram of an exemplary process 550 of the system, according to some embodiments of the present disclosure. At Step 552, the system may receive input from user for VO's and generate data for the VO's. Examples of data include those described in FIG. 1 above. At Step 544, the system may receive information for a scenario created or selected by the user, then generate data for the scenario. The system then may generate a scenario data structure with the data associated with the scenario. In some embodiments, the data may represent digital rendering of a virtual learning scenario. At Step 556, the system may load the VO's into the scenario. At Step 558, the system may save or publish the scenario into a repository. In some embodiments, when saving the scenario, each VO exposes its configuration in the scenario (including position, rotation, and other state attributes). The system compiles all VO's configuration, e.g., into a JSON, which is saved in the repository. At Step 560, the system may receive search and/or browse requests for scenarios. At Step 562 the system may search the repository for the requested scenario and transmit the scenario.

Exemplary Practical Applications

An exemplary practical application of the system of the present disclosure, a tension test is now described. In some embodiments, the system may use nonlinear Finite Element Analysis (FEA) to visualize changes occurring within a specimen, e.g. during a test. This offers the benefit of enabling users to see changes occurring inside the specimen and gain new insights not possible with the physical tests. FEA may be implemented as software. FEA may be used, for example, when high fidelity is required by a training scenario. In some embodiments, the system may allow the users to import pre-computed results from third party FEA software. The virtual object model may be extended to handle FEA model data and simulation results. Previously, the virtual object model contained only CAD data. The specimen may be modeled using a preprocessor (e.g., Abaqus CAE) and the input mesh (.inp file) is obtained. Next, the simulation may be performed and simulation results (.rpt files) are generated. A converter script (e.g., in Unity 3D C #) may be implemented to extract from the .inp and .rpt files only the following information needed by the virtual object model to efficiently render and animate the test specimen. The .inp file provides the node positions at the specimen's initial condition, allowing a mesh to be constructed. The .rpt files contain the Von Mises stress and position of each node for each time step in the simulation. At each time step, the simulation may update the position and color (based on the stress value) of each vertex in the mesh.

Figure 6:
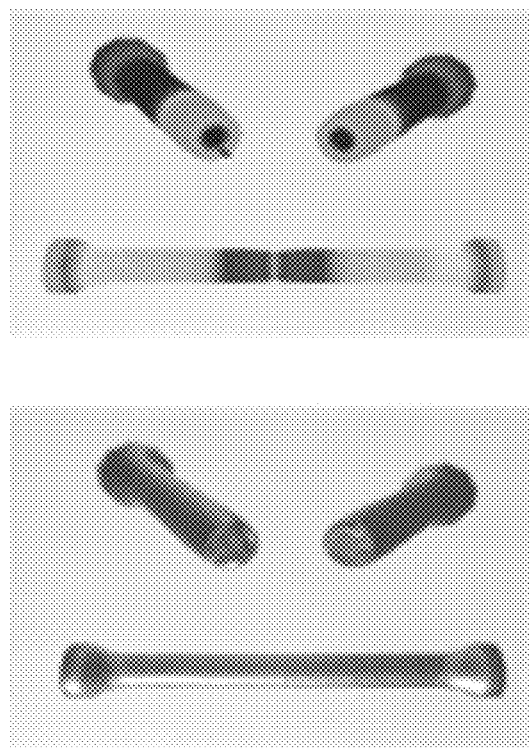
FIG. 6 illustrates a rendering of a virtual object and its fracture surfaces according to exemplary embodiments of the present invention.
Figure 8:
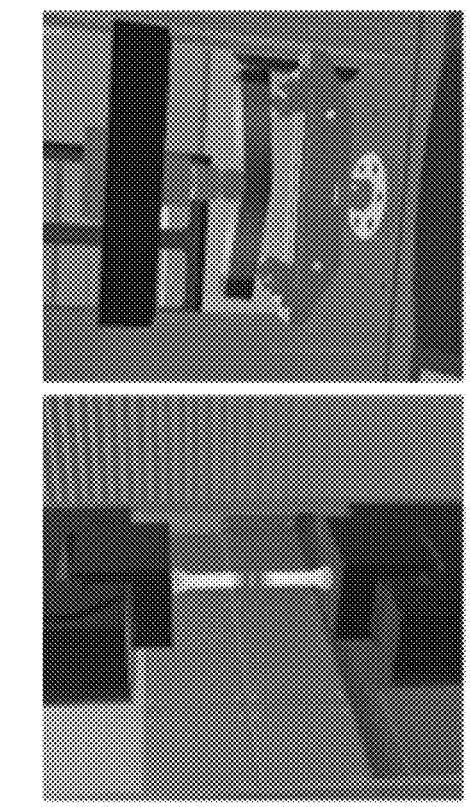
FIG. 8 illustrates in-situ visualization of stress contours, according to exemplary embodiments of the present invention.
Figure 7:
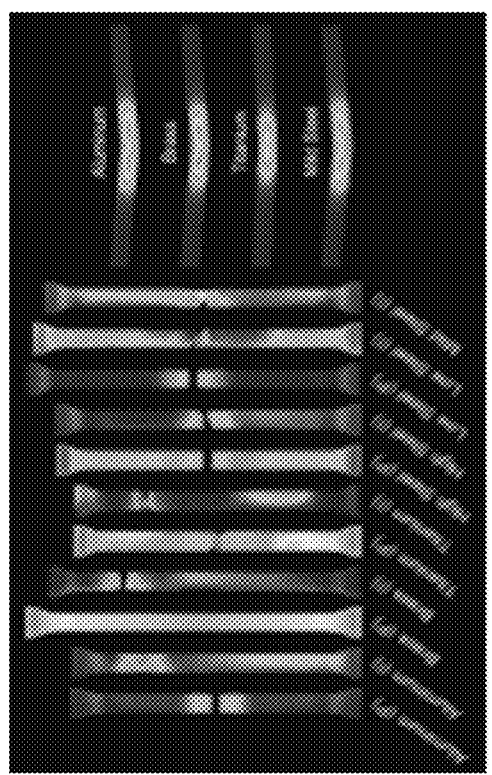
FIG. 7 illustrates test simulations conducted on various materials, according to exemplary embodiments of the present invention.

Next, a texture and normal map may be applied to each of the meshes in order to realistically render the virtual object and its fracture surfaces, as illustrated in FIG. 6. Texture and normal map data may be contained within a file that may be stored along with the rest of virtual object data in the database or repository. To prepare the mesh for virtual object, the remaining sub-models may be added. This procedure can then be repeated to produce virtual objects for aluminum, brass, titanium, high steel, low steel, and mild steel materials with and without imperfections (flaws). Three-point bending test simulations were also conducted for aluminum, brass, titanium, and mild steel, as illustrated in FIG. 7. Specimen mesh and animations for the other types of materials and testing conditions can also be generated in order to provide training scenarios for other types of testing. FIG. 8 illustrates in-situ visualization of stress contours.

It should be noted that FIGS. 6-8 further illustrate that the system of the present disclosure is first in using FEA simulation in XR training. As described above, the system describes a flexible virtual object model that is capable of representing both equipment and FEA simulation results. It should also be noted that while the embodiments described herein are limited to mechanical and material testing, they may also be included in other industries as stated herein and have widespread training applications for in-situ visualizations of phenomena that are invisible to the naked-eye.

In some embodiments, the system may allow the users to upload simulation results (e.g., from ABAQUS solver) to obtain an interactive high fidelity virtual object, thus reduce the programming skill and effort required, and substantially expand the set of useful training simulations and number of potential users.

Figure 9:
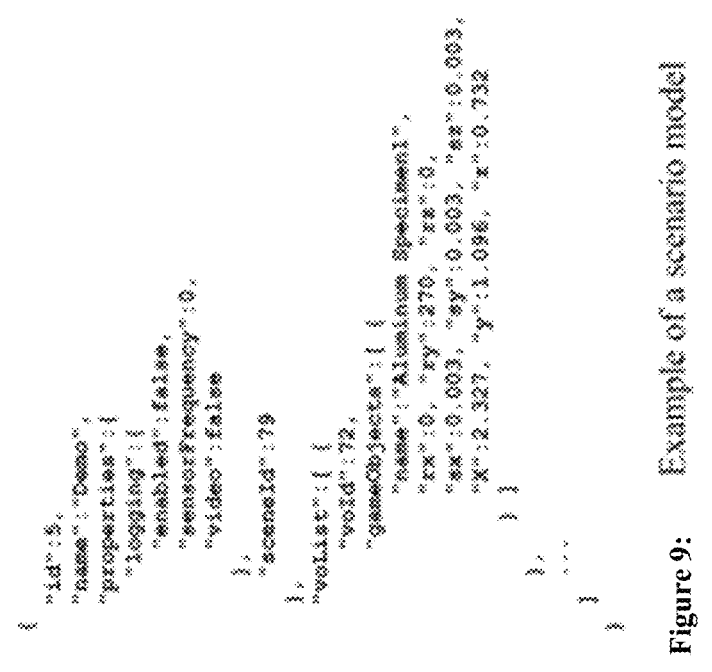

Based on the simulation, scenario and task instruction models may be developed. In some embodiments, general reusable modules for authoring can be developed in parallel, as described below. A JSON-based scenario model representation, as illustrated in FIG. 9, may be developed to enable authors to flexibly define general scenarios. The scenario model may be used to define the overall environment, which includes, for example, the setting, the virtual objects, the user interface elements, and other rules of the environment. In some embodiments, for example as in the tensile test, the scenario model may specify a lab space containing a table with a number of test specimens and a test machine with accompanying computer display, as illustrated in FIG. 10. Other machines and/or test specimens (that are present in the repository) may also be specified. The JSON may contain fields that specify the scenario-name, set of configuration parameters such as logging information, the virtual objects that should be included and their positions (x, y, z) and orientations, etc. In some embodiments, when a scenario loads, the application (e.g., the Desktop, VR, or AR module), e.g., built using and running on top of Unity 3D, may interpret the JSON, load each listed virtual object id from the online repository and render the scenario. The system may look up the virtual object id, download via HTTP, and cache the virtual object file from the repository. A key benefit of defining scenarios in terms of virtual objects in the repository is that the scenario author does not need to know about scripting languages that may or may not be required for defining the virtual objects and their interactions with users and other objects. Once the scenario is defined, the next step may be to define the task the user needs to carry out, e.g., to realize training or assessment goals.

In some embodiments, the task model, as illustrated in FIG. 11, may define the tasks to be completed by the user (e.g., perform tension test on a specimen) and may be represented by a separate JSON data structure. Authors may define tasks via a desktop app module or within the VR or AR module. Tasks can be high level, such as perform tension test, or detailed and include detailed step-by-step instructions. Using cooking as an example, the high-level task may be when a user states "make an omelet" or detailed, which would include step-by-step instructions such as heat pan, break eggs, transfer eggs to pan, etc. Task model JSON may contain a sequence of tasks. For each task, it may specify the prompt and several optional parameters to control various features of the task, such as task flow, amount of guidance, etc. The task model JSON may contain fields for the name of the task that is displayed in the user interface (which may be the display of the computing device), instruction text that is displayed in the user interface, explanation text that is displayed in the user interface when a user requires more details about the task, either through a voice command or hitting a button on the UI panel in the XR device, such as a floating "More Details" button, objects to highlight, videos, and many other parameters that facilitate easier user interaction with the specimen virtual object.

It should be noted that although JSON is used in the examples herein, other suitable languages and tools may also be used.

In some embodiments, upon loading and interpreting the task model JSON, the system may guide users using a rich multimedia system with visual and audio interfaces that may include not only the familiar graphical-user-interface (GUI) elements, such as text-panels and buttons, but also voice-user-interface (VUI) elements such as spoken-text prompts. To implement VUI, all text and explanation fields may be extracted from JSON and used with a text-to-speech service, such as Amazon Polly, which may be called, e.g., by the Unity 3D application, to generate virtual object clips to be played back to the user in the XR environment. Text extracted from JSON may also be used to detect user's intent based on his or her utterances and the simulation context. In some embodiments, on XR devices, the system may allow the users to advance to the next step by merely saying certain commands like "next." In some embodiments, the system may provide, implement or support "Smart" instructions using custom scripts for executing certain commands. For example, there may be a "step-completion-detector" function that gets automatically executed at the end of each task step.

Figure 12:
FIG. 12 illustrates a perspective view of the instruction panel, according to exemplary embodiments of the present invention.

The system, with task JSON specification, may include conditional expressions to implement the step-completion-detector. Such conditional expressions may be defined using a pre-defined set of keywords and built-in functions (provided by the authoring software) that cover many common cases and thus reduce or remove the need for coding. For example, the system may provide preprogrammed custom scripts that would execute certain commands. The system may enable users to create "basic" task instructions using a text-editor or form-like user interface so that they or other users can experience rich multimedia instructions, as illustrated in FIG. 12. The user may also be able to define "smart" instructions through a user interface to create more complex behaviors without the need for coding. In some embodiments, executing certain commands may be done without the need to rely on any coding, for example, using smart instructions.

In some embodiments, the system may include modules for personalizing a user's experience by extending the data collection pipeline, as detailed below, with the ability to create evidence rules, e.g., by extracting user-defined measures from the data. In some embodiments, such an extraction may be done using a Python script. The Python-based measure-extraction step may involve ingesting the raw data from action streams, sensor streams, and survey responses, data cleaning, and then mapping the values or an aggregation of those values to a measure. The measures can be fed into statistical models (e.g., Bayesian Networks) to infer proficiency of the users.

An inference engine may also contain an interface to store, update, and report proficiency values into database tables. In some embodiments, the system may include a database schema in the cloud to store user model variables representing aspects of the user's conceptual and procedural knowledge as well as other self-reported attributes such as video games experience, VR proficiency, does the user get motion sick, gender, demographic variables, English language skills, etc. In some embodiments, the authors may be able to define evidence rules to analyze the user's work product generated while experiencing the XR content, interacting with virtual objects, etc. The system may provide a graphical user interface to help the non-programmer author define these evidence rules, e.g., to analyze the user's work product generated while experiencing the XR content, interacting with virtual objects, etc.

Figure 13A:
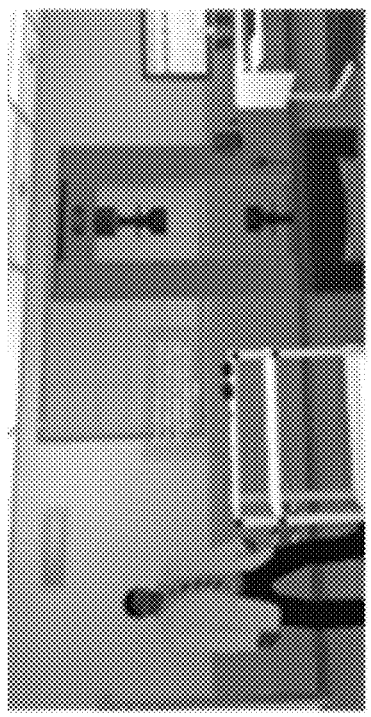
FIG. 13A illustrates a perspective view of a pedagogical agent, according to exemplary embodiments of the present invention.

Usability tests may also be conducted. For example, the users may be asked whether the pedagogical agent (PA) should be kept or removed. A PA is a virtual person (VP) containing knowledge about the XR environment and may interact with the user or the XR environment. In some embodiments, thus, there may be a PA while in other embodiments it may not be there. VP models may be rigged properly during virtual object creation in a plugin (e.g., Unity3D) so that they may have realistic and natural preset animations such as walking, looking, talking, turning, etc. For instance, an author may have a virtual user walk towards the test machine and explain the proper use of the machine to other users, as illustrated in FIG. 13A. The PA may be authored to include a VP model, as illustrated in FIG. 13B. In summary, adding the VPs may enable the author to add interactive PAs to the XR simulations without coding by authoring within the desktop module.

In some embodiments, virtual assistants, for example Alexa, Google, Siri, and Cortana, may be communicatively linked to the system. The system may make HTTP calls to the virtual assistant when triggered by the user, and the virtual assistant may detect the user's intent. Users may be able to ask the PA questions in various languages. For example, users may ask questions related to the XR environment, such as "where is the caliper?" and in response, the PA can highlight the caliper in the XR environment using an arrow, laser beams, or any other form of identification. Text extracted from scenario JSON and virtual object JSON may be necessary for this functionality. In some pilot tests, this feature was rated highly by users for providing higher engagement and learning. This capability enables the system to create learning experience that can potentially rival one-to-one tutoring by a human expert. Beyond simple string matching, the JSON specification can also be used to define a knowledge graph (KG) of virtual objects, their properties and their interactions with other VO's, VP's etc. This KG can be used to perform reasoning necessary to handle certain queries. For example, consider the query "What can I use to measure the specimen". The correct answer, in the context of a scenario that contains a caliper, is "You may use a Caliper to measure the specimen". The Object to Object interaction is represented as "Caliper Measures Length of Specimen" (VO1(Caliper)-Relation(Measures Length of)-VO2(Specimen).

Modules

In some embodiments, the system may include modules, some of which are described below. Each module may exist separately in the system or in combination with other modules described herein.

In some embodiments, one of the modules may be the virtual object Publisher plugin, e.g., Unity Plugin or SolidWorks Plugin, using which, the user may specify some inputs and push the upload button, which may build asset bundles from virtual object components, compile scripts and combine them into a package asset bundle file that is ready to be uploaded into the online repository. The virtual object creation and upload process may be streamlined so that third parties can also publish virtual objects into the repository.

Another module, Online Repository, may include several web services, a database, and a document storage. The database may be a MySQL relational database (or any other database) containing tables for the metadata about the virtual objects and scenario entities. The web service, which may be built using Java Spring Framework (or using other frameworks), may provide connectivity to the database to read, create, update, or delete (CRUD) those entities. The document storage, which may use any offline or online storage space, such as Amazon Simple Storage Service (S3), may contain a cloud file storage of the asset bundle, scripts, icons, and properties of the JSON files.

In some embodiments, another module, Data Pipeline/Data Logging module, may be built using any offline or online web services, such as Amazon Web Services, to log user data. It may include a web service endpoint for any application to push sensor or action data as well as the player's point-of-view video, and a MySQL relational database to store and support database queries against user ids, action types, and other attributes. The system may send sensor (position, orientation) data of a headset and controller and/or information regarding the events triggered when a user interacts with virtual objects, teleports, etc. via HTTP in JSON format to the data logging module.

Figure 14A:
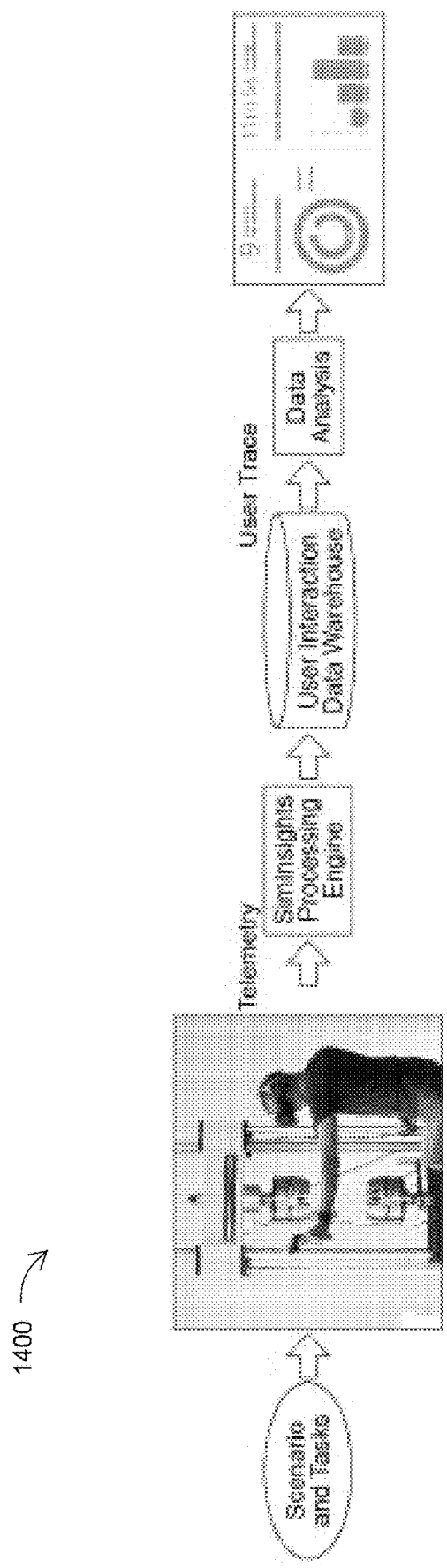
FIGS. 14A and 14B illustrate a high-level diagrams of exemplary data collection process, according to exemplary embodiments of the present invention.
Figure 14B:
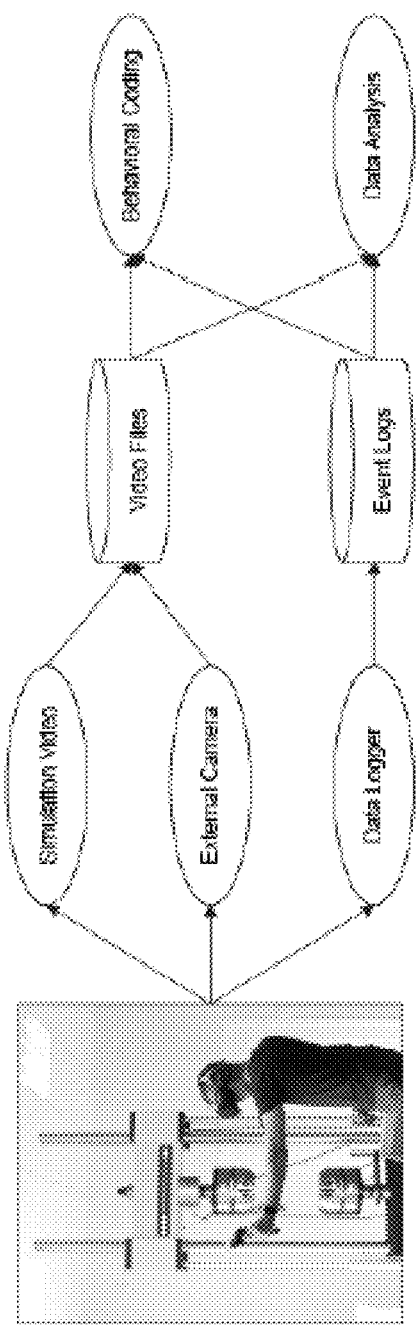

FIGS. 14A and 14B illustrate a high-level diagrams of exemplary data collection process 1400. In some embodiments, multiple types of data may be collected: time series data, event data and video data. The time series data may capture the spatial position and orientations of a headset and controllers at predefined frequency. The event data may capture interactions with virtual objects, the virtual environment, and user interface. In addition, users may be videotaped during the XR activity. The users' view within the XR environment may also be captured. By comparing a user's event log with the task model representation, the system can determine time spent on each task and whether the user has performed the steps correctly. The system may leverage this dataset to build detectors for users' attentional states (focused or distracted) and other states.

In some embodiments, the system my use logged data to personalize user experience. The system may build domain ontologies and a Bayesian Network or deep neural network (or a suitable AI method) based inference engine for proficiency assessment of user performing tasks in a simulation environment. The system may integrate the inference engine with the authoring software to provide the capability of defining personalization policies.

Figure 14C:
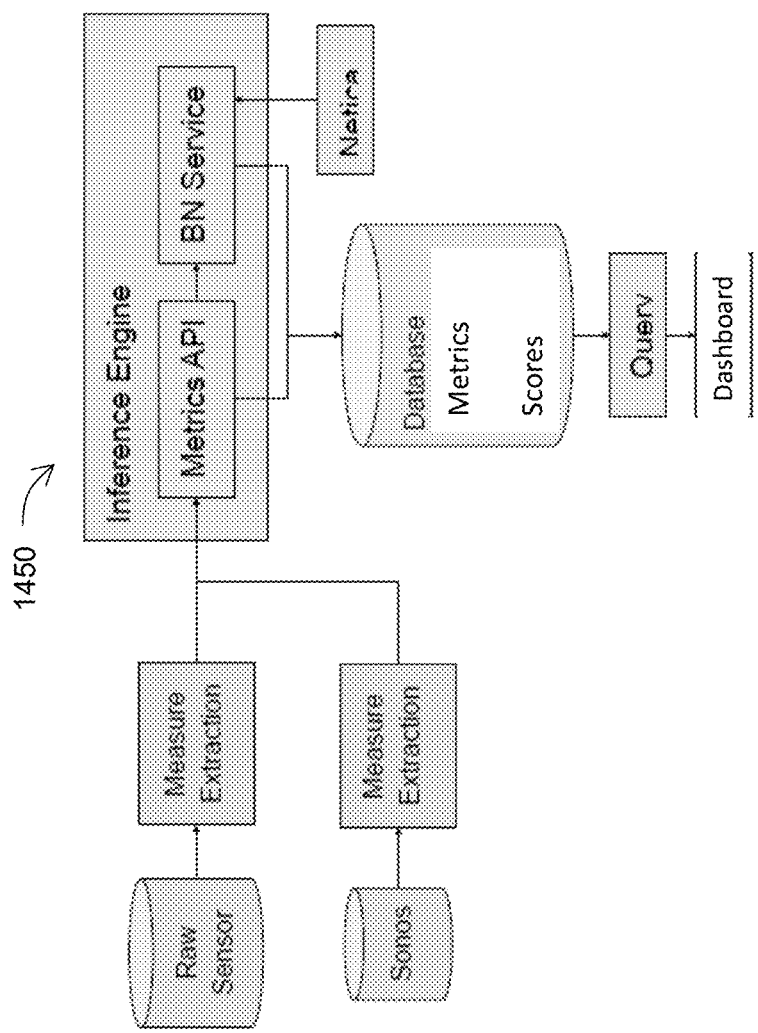
FIG. 14C illustrates a high-level diagram of integration of an inference engine, according to exemplary embodiments of the present invention.

FIG. 14C illustrates a high-level diagram of integration of inference engine 1450. In some embodiments, the system may include evidence rules by extracting user-defined measures from the data. The measure extraction step involves ingesting raw data from action streams, sensor streams, and survey responses, cleaning, and mapping values or an aggregation of those values to a measure. The measures can be fed into statistical models (e.g., Bayesian Networks using Netica) to infer proficiency. In some embodiments, behavior coding can be done using rules as well as machine learned models.

Figure 15:
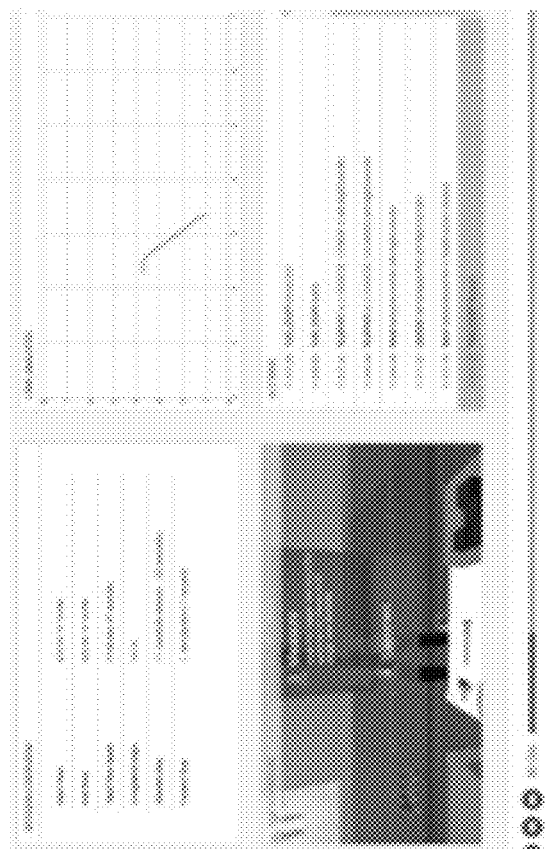
FIG. 15 illustrates a dashboard module, according to exemplary embodiments of the present invention.

Another module, the Dashboard, as illustrated in FIG. 15, may visualize the collected data in order to monitor and ensure that data is collected, e.g., during an operation or test. The dashboard may pull information via HTTP from the data logging module and renders charts and tables in the web browser. The dashboard may report on each XR session and user id.

Figure 16:
FIG. 16 illustrates a record/replay module, according to exemplary embodiments of the present invention.

The Record/Replay Module may be implemented to record a user's demonstrations in XR and replay it for other users to learn from or interact with. This may be achieved by recording the XR sensor and action data streams using the data logging module, storing them on an offline or an online storage space, such as a cloud server, and replaying in a synchronized manner. In some embodiments, the record/replay module, as illustrated in FIG. 16, may serve several purposes. As non-limiting example, it can facilitate users recording a narrated demonstration to teach other users (XR analog of a video-tutorial); users reviewing other users' performance on a task or a software module automatically evaluating it by comparing with another user's (such as an expert) demonstration; and users recording demonstrations to facilitate aspects of task authoring, such as defining a complex animation as well as using machine learning to automatically generate fragments of task model JSON such as step completion rules from actions and guidance animations.

In some embodiments, the system may further include the exemplary modules below.

| Module | Description | Use Example |
| --- | --- | --- |
| VO authoring module (Desktop feature) | Take a 3D model (e.g., in GLTF/GLB format, such as when exported from SolidWorks), convert it into a virtual object, and upload into the repository. Enable a user in the desktop version to browse through her own virtual object, add assembly instructions, and attach images to assembly instructions, | Manufacturing company design engineer can create step by step instructions for assembling a product on the production line. A professor can take a 3D CAD model of a machine and create an interactive VO with behaviors and upload to his online repository. Then, she can use this VO and other VO's to create an immersive |

-continued

| Module | Description | Use Example |
|---|---|---|
| | The system may use tags to model object to object interactions. This technical approach improves performance. | lab manual for students to follow and thereby learn a procedure. |
| VR Experience | Load and interact with scenarios and virtual objects in VR (Oculus Rift, HTC Vive, etc) | Factory workers are able to practice assembly or other tasks virtual before doing them in real world. Students are able to enter the tensile testing lab and interact with the environment. |
| AR Experience | Load and interact with virtual objects in AR (Hololens, MagicLeap, etc) | Allow users view instructions through Hololens while working on the physical machine |
| Sim Authoring (Desktop) | Provides desktop (PC, laptop etc.) user interface to author tasks, task instructions, user interactions, branching dialogue, etc. | User can use the VOs from her private or public repository to create a training scenario, without having to write code. |
| Sim Authoring (VR) | VR (Oculus Rift, HTC Vive, etc) user interface to build scenarios from virtual objects | Experts construct the tensile testing lab by placing virtual objects in the VR space |
| Sim Authoring (AR) | AR (Holoens, MagicLeap, etc) user interface to set up AR scenarios | Similar to VR sim authoring above, except there is no need for a space virtual object (e.g., room or lab) because the physical room/space serves that purpose. Author can select VOs from repository and place them in the scene/scenario, then add tasks and instructions. |
| 3D (Unity) Plugin | Converts supported 3D formats (Unity) into virtual objects | May be part of the Desktop. Upload the specimen, caliper, extensometer, etc. to the repository |
| Conversation Interaction module | Provides dialogue agents and intent recognition | The simulation contains one or more avatars (non-player characters or NPCs) able to understand questions such as "Where is the ___?" and respond via voice. |
| Object Recognition | Recognizes real world objects through AR devices | Used to detect image targets so that instruction panels can be placed above them |
| Multiplayer, telepresence and | Enables synchronous and asynchronous collaboration with others across devices and in author and experience modes | Enabled multiple experts to author scenarios together |
| Personalization | Activates strategies to modify the scenario to increase engagement or motivation based on decision logic that depends on evidence rules | Implement a rule that if the user self-reports gender to be female, select pink colored variant of virtual objects. If the user finishes the task within 5 minutes, then give them a 10-question quiz, otherwise give them a 5-question quiz. |
| Data Dashboard | Provides a user interface to monitor and retrieve logged data | Monitored data and retrieved raw data for further analysis |
| API/Backend | Provides API endpoints for all Desktop, AR, and VR authoring and experience modules to fetch and store information to the cloud | Provided the storage for data and endpoints for fetching that information |
| Data Pipeline | Backend service to record video and log and store sensor and event data in the VR/AR environment | Recorded and stored the sensor data, event data, and videos in the XR experience |
| Record/Replay | Takes a user's sensor data and replays the user's motion and action for review | Used to visualize a user's motion in the XR experience |

| Module | Description | Use Example |
|---|---|---|
| Telemetry module | Captures user-to-user, user-to-object, and object-to-object interactions and sensor data in the simulation and sends data logs representing the event to the data pipeline | Sent the sensor data and event data in the XR experience |

In some embodiments, with the Desktop, the system may take animations (such as exploded views), e.g., from third party software such as SolidWorks, and transform them into steps in assembly instructions. Another feature may allow users to browse through simulations they have created in a 3D environment. Users may also add tasks instructions to a simulation that will be reflected in the XR application. In some embodiments, users may specify "grabbable" and "controllable" interaction properties to virtual objects through the desktop. The "grabbable" interaction enables users, at experience time, to pick up and drop objects, while "controllable" interaction enables the control of the virtual object with a virtual handheld controller. A user is able to share a simulation with another user by username. The user is also able to view the shared simulation in their simulation list. In some embodiments, the system may not allow the user to edit the simulation.

Author-Publish-Evaluate

The above modules and those described here may be core utilities necessary to support author-publish-evaluate workflows of the system of the present disclosure. The author-publish-evaluate workflow is the workflow to allow domain experts to author a scenario (e.g., using Desktop module, VR or AR module), publish the scenario (e.g., using Desktop module) to other targeted users, and evaluate the workflow (e.g., using the data collected by the telemetry module).

Figure 17:
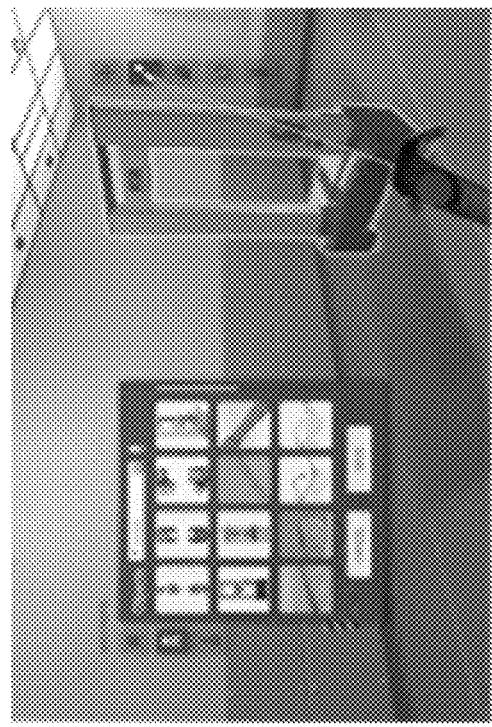
FIG. 17 illustrates an XR scenario authoring tool, according to exemplary embodiments of the present invention.

Exemplary embodiments of the system may be a VR app for HTC Vive™, AR app for MicroSoft Hololens™, VR app for Oculus Quest™, etc. Thus, the system may include a collection of authoring software that allows using an XR scenario authoring tool, as illustrated in FIG. 17, XR experience (published version of the authored experience) application, Data Pipeline, Dashboard, Dialogue Authoring, Task Instruction Authoring, Conversation Interaction Module, Object Recognition Module.

In an exemplary implementation, the VR app for HTC Vive may include VR tutorial tensile test followed by an eleven-question multiple-choice-quiz with feedback. The VR tutorial may teach users how to use the AR or VR controllers. Steps in the tutorial nay include instructions on how to navigate with teleportation (e.g., by holding the controller button down and releasing at a position), using objects (e.g., by pulling the trigger on an object), grabbing objects (e.g., by holding the trigger on an object), using voice commands (e.g., by holding the controller button and speaking), and interacting with the UI (by pulling the trigger on the UI button). After completing the tutorial, the user may perform the VR version of the tensile test lab. Each task in the scenario involved either performing an action, watching a video, or answering a quiz question.

Addition of a quiz in AR or VR may reinforce the content by helping users reflect on their experience. In addition to traditional multiple choices quizzes, novel interactive assessments can also be created using our system. Another benefit of the quiz in AR or VR include productive discussions with users, such as regarding a 3D-Immersive-Quiz that can be realized in multiple ways, e.g., a user may ask other users questions by pointing to virtual object's in the AR or VR environment, and new scenarios may be generated to put users in different problem solving situations within the AR or VR environment. After completing the AR or VR experience, the users may use the AR or VR experience in conjunction with an actual machine.

In some embodiments, usability dataset may be provided, which include surveys, sensor data and action data. The action data, with some examples illustrated in FIG. 18, may include timestamped actions captured during the user's simulation. The action data, as illustrated in FIG. 18 is not exhaustive. The sensor data may consist of the positions (x, y, z) and quaternion rotations (rx, ry, rz, rw) of the user's HMD, left controller, and right controller in a 3D virtual space at each timestamp. A sensor record was collected every 200 ms during playtime. The sensor may be located in the AR or VR controller.

Investigation and research were performed to assess the success, improvements and advantages of the system of the present disclosure. In one research, data for eighteen users were analyzed for the study. No significant differences were found for pre-existing factors including pretest and demographic factors. Five measures were administered to users including subject matter measures and survey measures relating to attitudes, self-efficacy, engagement, and background demographics. In addition to measures that users completed, action and sensor data were gathered on the virtual reality session. Results of the test data suggest an overall positive outcome for users participating in the VR activity first (experimental condition) compared to the physical machine activity first (control condition). Users who participated in the AR or VR activity first scored significantly higher on multiple choice subject matter mid-test scores, $F (1, 118)=5.54$, $p=0.02$ and Cohen's $d=0.71$, including significantly higher conceptual subscales scores, $F (1, 118)=13.60$, $p=0.00$ and Cohen's $d=0.86$. Analysis of open-ended subject matter responses indicate significantly higher gains for users in the AR or VR activity compared to the physical machine activity. Additionally, users who participated in the AR or VR activity first reported significantly higher engagement than those who participated in the machine first, $t(116)=4.14$, $p=0.00$. Subgroup analysis indicated a different performance pattern for female users. Specifically, when pretest to mid-test gain scores were analyzed, females in the experimental group gained twice as much over males after the AR or VR activity. Action data also revealed that female users spent more time in the tutorial. The test results show the advantages of AR or VR based lab training, and in particular of the system of the present disclosure, to engage users as well as lead to measurable learning outcomes. When viewed in conjunction with cost-savings compared to physical equipment, XRbased training can be highly promising to bring advanced manufacturing training to underrepresented and underserved communities.

Other advantages of the present system include, for example, compiling the scripts into .dll, storing, and fetching them separately. This allows the loading of complex functionality and interactions at runtime by attaching these scripts with the instanced virtual objects. This may also externalize the virtual objects' parameters and interaction specification, by storing them as a JSON properties file.

In some embodiments, the system may include machine learning to make the immersive (XR) environment intelligent, e.g., interact intelligently with the user. The system may recognize user's position, pose and affective states, behavior and gestures. The system may also provide intelligent contextual information, cues, instructions to the user.

To recognize a user's gestures such as head nod yes or no, the system may train a machine learning model and deploy it. Thus, there are inputs and outputs at training time and inference time. The system includes a novel record-replay feature to make it easy to annotate gestures including their start and end times. In other words, consider that the author releases a simulation and N number of users use it and their data is recorded. This dataset can be annotated and used to train machine learning models.

In some embodiments, the system may enable users to rapidly author a scenario and publish it so others can experience it and let the system collect data. In some embodiments, such as in human factors evaluation, it is of great advantage to automatically code the user behavior into various scenarios. In some embodiments, user behavior may be learned and/or trained using machine learning. In some embodiments, the system may include the following analyses for behavior coding. Link analysis involves using lines in a layout diagram to indicate the actual paths of where individuals involved in the scenario moves from and to. This may be used to identify high traffic areas. Bump analysis involves coding instances of physical contact between two objects—e.g., people and/or equipment—that are not intended to make contact. Both the total number of bumps as well as bumps into particular items may be considered. Congestion analysis involves coding instances where an individual experienced an object or person that is in her way. In some embodiments, congestion may be defined as instances where a path travelled between two objects, e.g., is 1 meter longer, and more than 20 percent longer, because that individual needs to go around a person or an object. Both the total number of instances of congestion as well as congestion experienced while performing specific subtasks may be considered. Interruption analysis involves coding instances where an individual interrupts or captures another person's attention while performing a task. The total number of interruptions and the location of where the interrupted person is standing when she is interrupted may be considered. Location data may be plotted onto a layout diagram to identify areas that are more prone to interruptions. Task completion time involves calculating the time to perform all tasks for each of the scenario roles. Selection error analysis involves coding instances where a user mistakenly selects a wrong item. The frequency of selection errors may be considered. Searching behavior analysis involves coding instances where the location of a supply or equipment is unknown to an individual needing it, and time is spent searching for it.

Those of skill in the art will also understand that the various embodiments, systems, algorithms, and process steps disclosed herein can comprise instructions stored in memory of a computing device, and that the instructions, when executed by one or more processors of the computing device, can cause the one or more processors to perform the functions of the embodiments, systems, algorithms, and process steps disclosed herein. In some embodiments, the various embodiments, systems, algorithms, and process steps may be designed so that it can be implemented as a software library suitable for integration into other applications, as a standalone software application, for example for execution on mobile phones, tablets, laptops or workstation computers, and also as a dedicated hardware solution, both using embedded processors, and also as a FPGA- or ASIC-based hardware design.

As used herein, a module may include software, hardware or a combination thereof.

System Architecture

Figure 19:
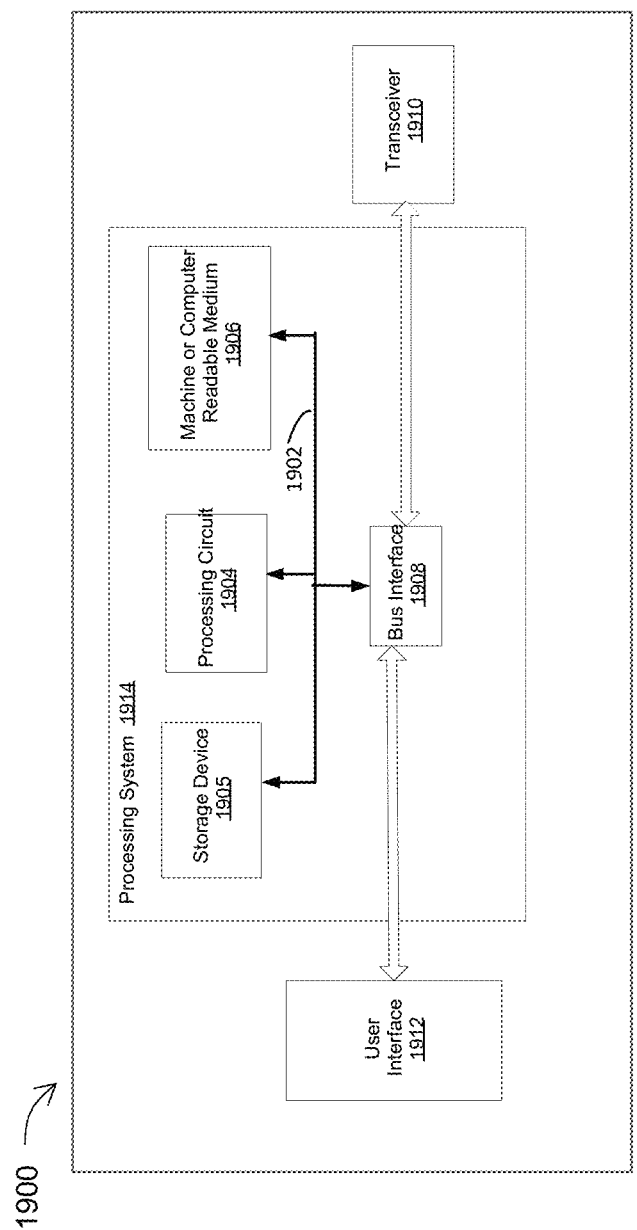
FIG. 19 illustrates an exemplary overall system architecture platform, according to exemplary embodiments of the present invention.

FIG. 19 illustrates an exemplary overall platform 1900 in which various embodiments and process steps disclosed herein can be implemented. In accordance with various aspects of the disclosure, an element, or any portion of an element, or any combination of elements may be implemented with a processing system 1914 that includes one or more processing circuits 1904. Processing circuits 1904 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1904 may be used to implement any one or more of the various embodiments, systems, algorithms, and processes described above. In some embodiments, the processing system 1914 may be implemented in a server. The server may be local or remote, for example in a cloud architecture.

In the example of FIG. 19, the processing system 1914 may be implemented with a bus architecture, represented generally by the bus 1902. The bus 1902 may include any number of interconnecting buses and bridges depending on the specific application of the processing system 1914 and the overall design constraints. The bus 1902 may link various circuits including one or more processing circuits (represented generally by the processing circuit 1904), the storage device 1905, and a machine-readable, processor-readable, processing circuit-readable or computer-readable media (represented generally by a non-transitory machine-readable medium 1906). The bus 1902 may also link various other circuits such as timing sources, peripherals, voltage regulators, and power management circuits, which are well known in the art, and therefore, will not be described any further. The bus interface 1908 may provide an interface between bus 1902 and a transceiver 1910. The transceiver 1910 may provide a means for communicating with various other apparatus over a transmission medium. Depending upon the nature of the apparatus, a user interface 1912 (e.g., keypad, display, speaker, microphone, touchscreen, motion sensor) may also be provided.

The processing circuit 1904 may be responsible for managing the bus 1902 and for general processing, including the execution of software stored on the machine-readable medium 1906. The software, when executed by processing circuit 1904, causes processing system 1914 to perform the various functions described herein for any particular apparatus. Machine-readable medium 1906 may also be used for storing data that is manipulated by processing circuit 1904 when executing software.

One or more processing circuits 1904 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

Figure 20:
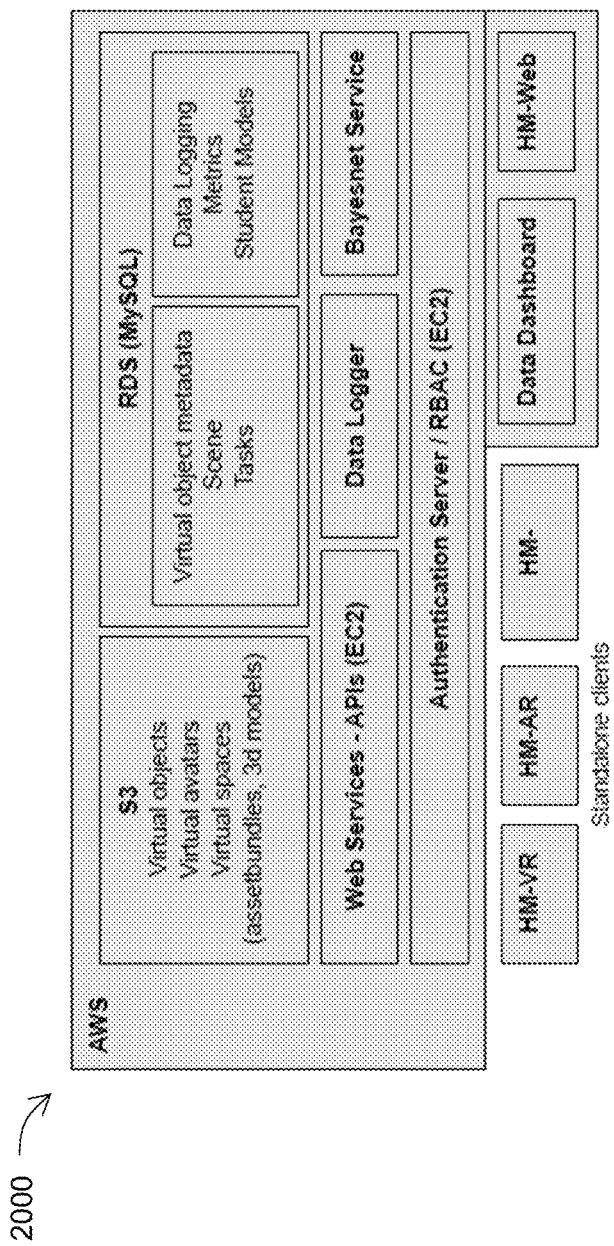
FIG. 20 illustrates an exemplary system implementation, according to exemplary embodiments of the present invention.

FIG. 20 illustrates a high-level diagram of an exemplary implementation 2000 of the present disclosure on an Amazon AWS™ backend and cloud server system.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

What is claimed is:

1. A computer-implemented authoring system for virtual immersive learning environment comprising:
   a server comprising a processor for automatically generating a scenario data structure;
   the server further comprising an authoring software configured to:
   generate first data for one or more virtual objects;
   generate second data representing digital rendering of a first virtual learning scenario;
   generate the scenario data structure associated with the first virtual learning scenario;
   store the scenario data structure in a digital data repository;
   generate and store data traces resulting from user interactions with the virtual objects and the virtual learning scenario;
   analyze the stored data traces to draw conclusions about users and their experiences within the virtual learning scenario using a suitable artificial intelligence (A.I.) method;
   based on the analyzed data traces, refine and enhance the first virtual learning scenario to personalize the learning experience for users;
   receive a search request for a requested third data, wherein the search request comprises data representing a second virtual learning scenario;
   search the digital data repository for the requested third data;
   transmit the requested third data;
   analyze user interaction data and scenario elements within a scenario data structure, where the analysis includes processing user interaction logs telemetry data, and virtual object interactions to determine contextually relevant associations within a scenario model, using predefined interaction policies and conditions that govern interactions between virtual objects and users, as specified in the scenario model and task instruction data;
   retrieve knowledge items from the scenario data structure based on scenario-defined interaction policies and conditions that specify contextual relationships between virtual objects, task instructions, and user interactions, where retrieval operations ensure selection of knowledge items associated with predefined interaction types, structured scenario components, and metadata attributes representing various content types and concepts, as stored within the task instruction model and scenario data structure; and
   filter the retrieved knowledge items by applying user-specific data, including interaction data traces, user feedback, and defined learning objectives, such that the resulting knowledge selection aligns with the learning goals and personalization metrics described in the user feedback data, task instruction model (TIM), and scenario data logging.

2. The authoring system of claim 1, wherein the first data comprises at least one of geometry data, rendering or visual data, motion data, interaction data, telemetry data, functions, and recognition aspects.

3. The authoring system of claim 1, wherein the first data comprises logged data during an immersive environment session.

4. The authoring system of claim 3, wherein the logged data is used to analyze a user's experience of the immersive environment session.

5. The authoring system of claim 3, wherein the logged data is collected using one or more cameras.

6. The authoring system of claim 3, wherein the logged data is collected using one or more sensors.

7. The authoring system of claim 3, wherein the logged data is used for personalizing user experience.

8. The authoring system of claim 1, wherein the first data comprises random properties.

9. The authoring system of claim 1, wherein the one or more virtual objects interact with a user.

10. The authoring system of claim 1, wherein the one or more virtual objects interact with other virtual objects.

11. The authoring system of claim 1, wherein the one or more virtual objects are optimized for mobile devices.

12. The authoring system of claim 1, wherein the one or more virtual objects are packaged into an asset bundle and scripts.

13. The authoring system of claim 1, wherein the one or more virtual objects is a virtual person.

14. The authoring system of claim 13, wherein the virtual person comprises preset actions.

15. The authoring system of claim 13, wherein the virtual person comprises dialoging ability.

16. The authoring system of claim 1, wherein the first virtual learning scenario comprises one or more tasks and associated task instructions.

17. The authoring system of claim 1, wherein the one or more virtual objects represents a physical specimen.

18. The authoring system of claim 1, wherein the requested third data is a simulation in a 3D environment.

19. The authoring system of claim 1, wherein the authoring software is further configured to receive a browse request.

20. The authoring system of claim 1, wherein the authoring software is further configured to provide a 3D user interface to receive user input.

* * * * *